(12) United States Patent
Yanagida (10) Patent No.: US 10,471,791 B2
(45) Date of Patent: Nov. 12, 2019

(54) SUSPENSION DEVICE

(71) Applicant: HONDA MOTOR CO., LTD., Minato-ku, Tokyo (JP)

(72) Inventor: Takuya Yanagida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 64 days.

(21) Appl. No.: 15/558,902

(22) PCT Filed: Mar. 19, 2015

(86) PCT No.: PCT/JP2015/058176
§ 371 (c)(1),
(2) Date: Sep. 15, 2017

(87) PCT Pub. No.: WO2016/147370
PCT Pub. Date: Sep. 22, 2016

(65) Prior Publication Data
US 2018/0079269 A1    Mar. 22, 2018

(51) Int. Cl.
| | |
|---|---|
| *B60G 7/02* | (2006.01) |
| *B60G 15/04* | (2006.01) |
| *B60G 3/20* | (2006.01) |
| *B60G 15/02* | (2006.01) |

(52) U.S. Cl.
CPC ............ *B60G 7/02* (2013.01); *B60G 3/20* (2013.01); *B60G 15/02* (2013.01); *B60G 15/04* (2013.01)

(58) Field of Classification Search
CPC .......... B60G 7/02; B60G 15/04; B60G 7/008; B60G 15/02; B60G 7/001; B60G 3/20; B60G 2204/143; B60G 2200/141; B60G 2204/1244; B60G 2204/129; B60G 2204/148
See application file for complete search history.

(56) References Cited

U.S. PATENT DOCUMENTS

| | | | | |
|---|---|---|---|---|
| 2,304,291 A | * | 12/1942 | Wahlberg | B60G 15/06 280/124.127 |
| 2,549,942 A | * | 4/1951 | Smith | B60G 15/06 267/222 |
| 4,758,018 A | * | 7/1988 | Takizawa | B60G 3/202 280/124.109 |
| 4,840,396 A | * | 6/1989 | Kubo | B60G 3/202 280/124.143 |

(Continued)

FOREIGN PATENT DOCUMENTS

| | | |
|---|---|---|
| DE | 10 2010 029 032 A1 | 11/2011 |
| EP | 0 691 225 A1 | 1/1996 |

(Continued)

*Primary Examiner* — Drew J Brown
(74) *Attorney, Agent, or Firm* — Carrier Blackman & Associates, P.C.; Joseph P. Carrier; Fulchand P. Shende (57) ABSTRACT

Provided is a semi-trailing suspension device including: a trailing arm that is coupled to a vehicle body in a turnable manner; a trailing bush that is provided between the vehicle body and the trailing arm and pivotally supports the trailing arm in a turnable manner; a lower arm that is coupled to the vehicle body in a turnable manner; a lower arm bush that is provided between the vehicle body and the lower arm and pivotally supports the lower arm in a turnable manner; and a hinge mechanism that couples the trailing arm and the lower arm to each other in a relatively displaceable manner.

2 Claims, 9 Drawing Sheets

(56) References Cited

U.S. PATENT DOCUMENTS

| | | | | |
|---|---|---|---|---|
| 5,829,764 A * | 11/1998 | Griffiths | ............... | B60G 3/26 |
| | | | | 280/5.52 |
| 6,099,005 A * | 8/2000 | Wakatsuki | ............... | B60G 3/20 |
| | | | | 280/124.135 |
| 2004/0135338 A1 * | 7/2004 | Asteggiano | ............. | B60G 3/14 |
| | | | | 280/124.134 |
| 2010/0102527 A1 | 4/2010 | Yanagida | | |
| 2011/0227310 A1 | 9/2011 | Pollmeyer et al. | | |
| 2012/0068431 A1 * | 3/2012 | Jakob | ................... | B60G 3/145 |
| | | | | 280/124.128 |
| 2013/0175747 A1 * | 7/2013 | Uemori | ................ | B60G 11/16 |
| | | | | 267/170 |
| 2018/0093541 A1 * | 4/2018 | Matsushita | ............. | B60G 3/20 |
| 2018/0215221 A1 * | 8/2018 | Matsushita | ........ | B60G 21/0551 |

FOREIGN PATENT DOCUMENTS

| | | | | |
|---|---|---|---|---|
| JP | 2007210398 A * | 8/2007 | ............ | B60G 3/202 |
| JP | 2008-195296 A | 8/2008 | | |
| JP | 2012-512096 A | 5/2012 | | |

\* cited by examiner

SUSPENSION DEVICE

TECHNICAL FIELD

The present invention relates to semi-trailing suspension devices.

BACKGROUND ART

Figure 9A:
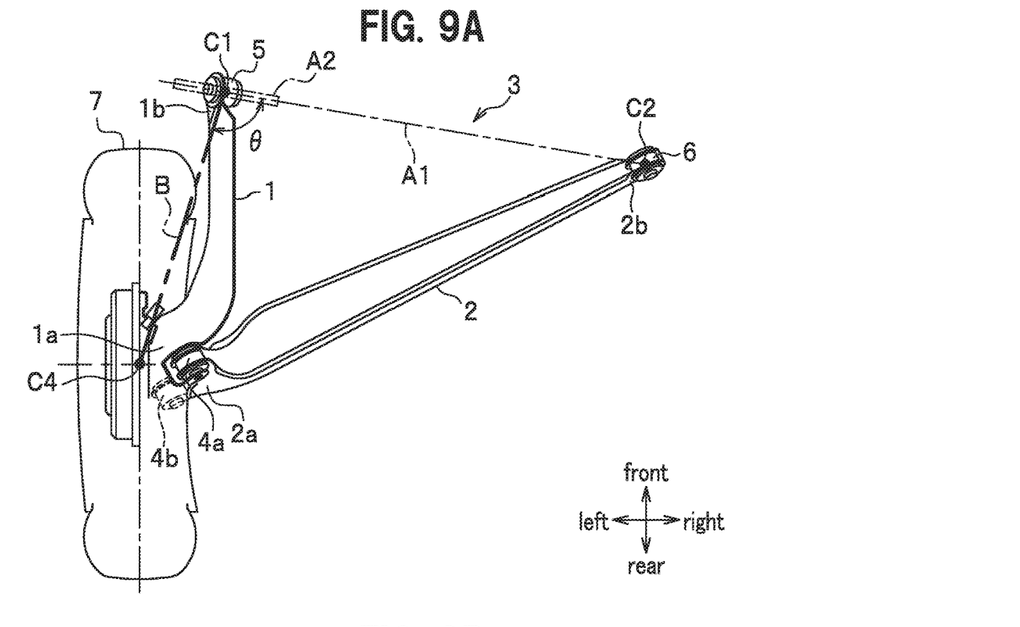
FIG. 9A is a top view of a suspension device according to a conventional technique.

For example, Patent Literature 1 discloses a semi-trailing suspension device 3 that is divided in advance into a trailing arm 1 and a lower arm (one piece arm) 2 as shown in FIG. 9A. In the suspension device 3, a vehicle rear side end 1a of the trailing arm 1 and a vehicle width direction outer end 2a of the lower arm 2 are hinge-coupled by two rubber bushes 4a, 4b.

A vehicle front side end 1b of the trailing arm 1 is attached to a vehicle body via a trailing bush 5 in a turnable manner. A vehicle width direction inner end 2b of the lower arm 2 is attached to the vehicle body via a trailing bush 6 in a turnable manner. In this case, a suspension movable axis A1 (see dotted and dashed line) with respect to the vehicle body is formed by connecting a turning center point C1 of the trailing arm 1 to a turning center point C2 of the lower arm 2 with each other.

CITATION LIST

Patent Literature

Patent Literature 1: EP0691225B1

SUMMARY OF INVENTION

Technical Problem

Meanwhile, in the suspension device 3 disclosed in Patent Literature 1, a turning axis A2 of the trailing bush 5 and the suspension movable axis A1 are provided so as to be aligned on the same axis (A1=A2).

Figure 9B:
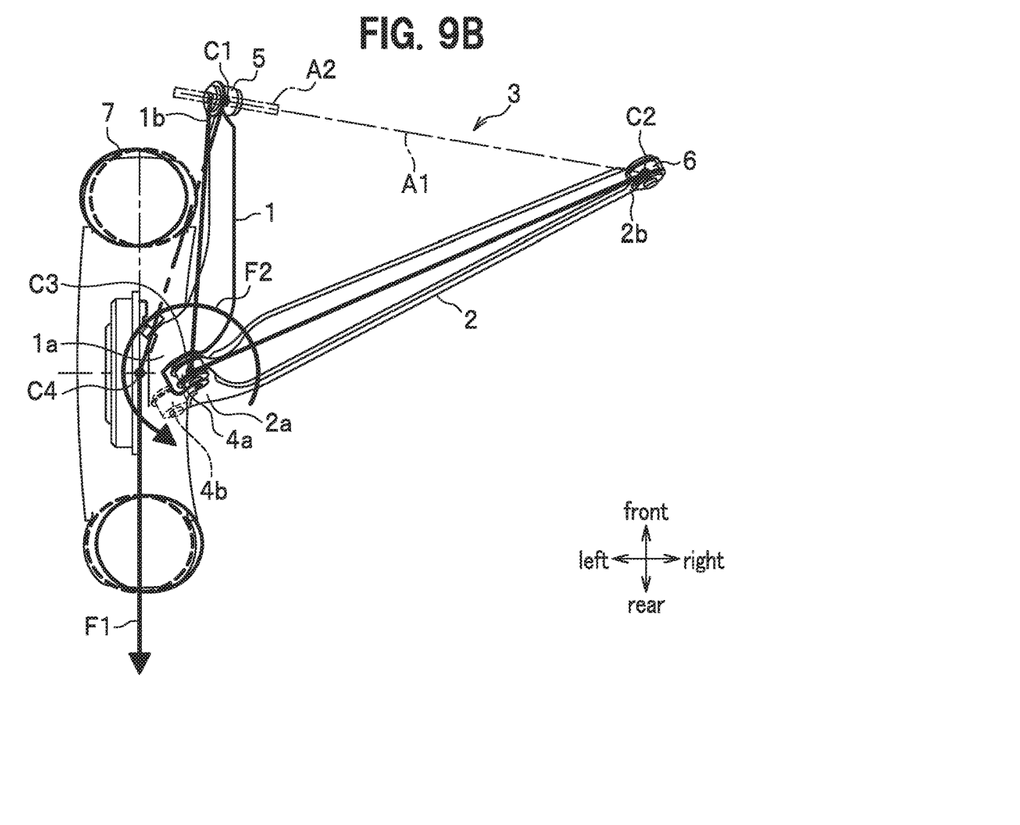
FIG. 9B shows a state where a braking force is applied to a wheel in the suspension device shown in FIG. 9A.

Thus, in the suspension device 3 disclosed in Patent Literature 1, for example, when a braking force is applied to a wheel 7 and thereby a load in an arrow direction F1 is inputted, a load F2 in the arrow direction (counterclockwise direction as viewed from top) is sometimes generated with a turning center at the turning center point C3 of the rubber bush 4a connecting the turning center point C1 of the trailing bush 5 to the turning center point C2 of the lower arm 2 with each other (see FIG. 9B). The load F2 in the arrow direction (counterclockwise direction as viewed from top) may turn and displace the wheel 7 in a front-open toe-out direction and impair comfort as to the vehicle stability.

In the suspension device 3 disclosed in Patent Literature 1, the turning axis A2 of the trailing bush 5 and an imaginary line B that connects an axle center point C4 to the turning center point C1 of the trailing bush 5 with each other are formed so as to intersect at an angle θ that is larger than 90 degrees (θ>90 degrees) as shown in FIG. 9A.

It is an object of the present invention to provide a suspension device capable of ensuring vehicle stability even when a braking force is applied to a wheel.

Solution to Problem

For achieving the above object, according to one aspect of the present invention, a semi-trailing suspension device includes: a trailing arm that is coupled to a vehicle body in a turnable manner; a trailing bush that is provided between the vehicle body and the trailing arm and pivotally supports the trailing arm in a turnable manner; a lower arm that is coupled to the vehicle body in a turnable manner; a lower arm bush that is provided between the vehicle body and the lower arm and pivotally supports the lower arm in a turnable manner; and a hinge mechanism that couples the trailing arm and the lower arm to each other in a manner allowing relative displacement, in which a turning axis of the trailing bush is disposed to be inclined toward a vehicle body inner rear side as viewed from top, with respect to a suspension movable axis that connects a turning center point of the trailing arm with respect to the vehicle body to a turning center point of the lower arm with each other.

According to the present invention, since a turning axis of the trailing bush is disposed to be inclined toward the vehicle body inner rear side as viewed from top with respect to the suspension movable axis that connects the turning center point of the trailing arm to the turning center point of the lower arm with each other, for example, when a braking force is applied to a wheel, a load in the clockwise direction is applied to a point where the trailing arm and the lower arm are coupled to each other. Thus, according to one aspect the present invention, the turning center point of the trailing arm is displaced into the vehicle width direction inner side, and direction of the wheel turns to a narrowing toe-in direction. Consequently, according to one aspect of the present invention, vehicle stability (or direction stability of vehicle) is ensured in an appropriate manner even when a braking force is applied to the wheel.

According to the present invention, a semi-trailing suspension device includes: a trailing arm that is coupled to a vehicle body in a turnable manner; a trailing bush that is provided between the vehicle body and the trailing arm and pivotally supports the trailing arm in a turnable manner; a lower arm that is coupled to the vehicle body in a turnable manner; a lower arm bush that is provided between the vehicle body and the lower arm and pivotally supports the lower arm in a turnable manner; and a hinge mechanism that couples the trailing arm and the lower arm to each other in a relatively displaceable manner, in which an intersection angle between an imaginary line that connects an axle center point of a wheel to a turning center point of the trailing arm with each other, and a turning axis of the trailing bush is set to be smaller than or equal to 90 degrees.

According to the present invention, the intersection angle (θ) between the imaginary line that connects the axle center point of the wheel to the turning center point of the trailing arm with each other, and the turning axis of the trailing bush is set to be smaller than or equal to 90 degrees, and thereby for example, when a braking force is applied to the wheel, a load in the clockwise direction is applied to a point coupling the trailing arm and lower arm to each other. Thus, according to one aspect of the present invention, the turning center point of the trailing arm is displaced into the vehicle width direction inner side, and direction of the wheel turns to a narrowing toe-in direction. Consequently, according to one aspect of the present invention, vehicle stability (or direction stability of vehicle) is ensured even when a braking force is applied to the wheel.

Further, according to the present invention, the semi-trailing suspension device further includes: a damper that attenuates vibration transmitted from a wheel, and a spring, in which the damper and the spring are disposed separately from each other on the lower arm, and the damper is disposed closer to a vehicle width direction inner side of the lower arm than the spring.

According to the present invention, since the damper is disposed closer to the vehicle width direction inner side of the lower arm than the spring, for example, when a braking force is inputted, movement of a damper attachment point (damper support point) caused by displacement of the trailing arm and lower arm may be suppressed to the minimum. Thus, according to one aspect of the present invention, ride comfort is enhanced, and vehicle width direction space of the vehicle may be increased.

Further, according to the present invention, the trailing arm includes: an arm body section that is located at a rear end in the vehicle front-rear direction and provided with the hinge mechanism is provided; an L-shaped bent section that is mounted to the trailing bush and is bent in a substantially L-shape in the top view; a linear section that is continuous to the L-shaped bent section and extends in a substantially linear manner along the vehicle front-rear direction, and an intersection section that extends from the linear section to the arm body section, extends from the vehicle width direction inner side toward the vehicle width direction outer side as viewed from top, and intersects with the vehicle front-rear direction.

According to one aspect of the present invention, the trailing arm includes the arm body section, L-shaped bent section, linear section, and intersection section, and thereby a distance between a turning center point of the trailing arm and a turning center point of the lower arm may be set longer as compared with conventional techniques. Thus, according to one aspect of the present invention, rigidity to the lateral force may be enhanced, and a toe variation due to lack of the rigidity may be suppressed.

Further, according to one aspect of the present invention, the distance from the arm body section to the turning center point of the trailing arm may be set longer, and thereby an intersection angle (θ) between an imaginary line that connects the axle center point of the wheel to the turning center point of the trailing arm with each other and the turning axis of the trailing bush may be reduced. Consequently, according to one aspect of the present invention, the prying angle of the trailing bush in the suspension stroke may be suppressed, and durability of the trailing bush may be further enhanced.

Advantageous Effects of Invention

According to one aspect of the present invention, even when a braking force is applied to the wheel, the suspension device ensures vehicle stability.

DESCRIPTION OF EMBODIMENTS

Figure 1:
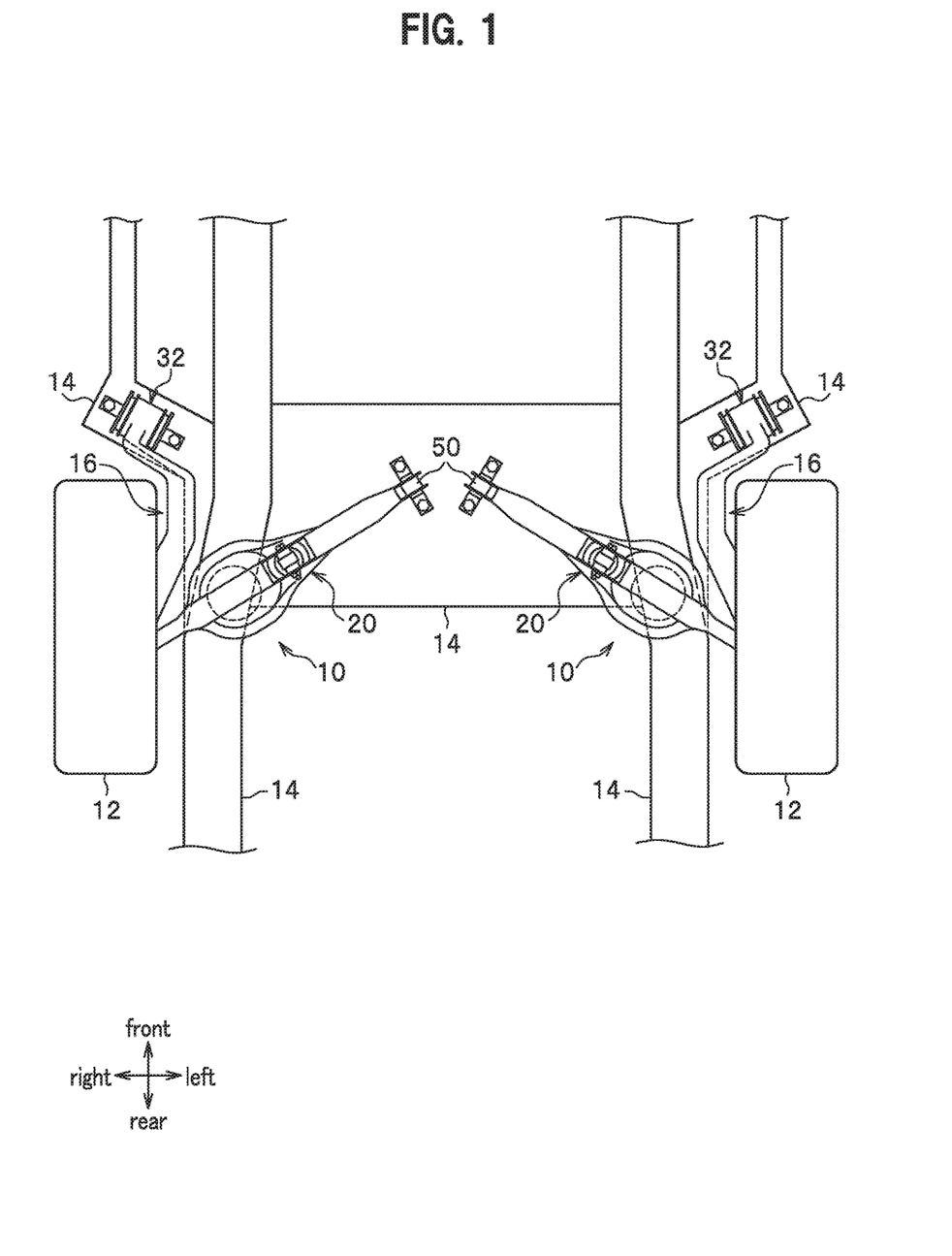
FIG. 1 is a bottom plan view of a state where a suspension device according to an embodiment of the present invention is applied respectively to a left rear wheel and a right rear wheel, as viewed from right below a vehicle.
Figure 2:
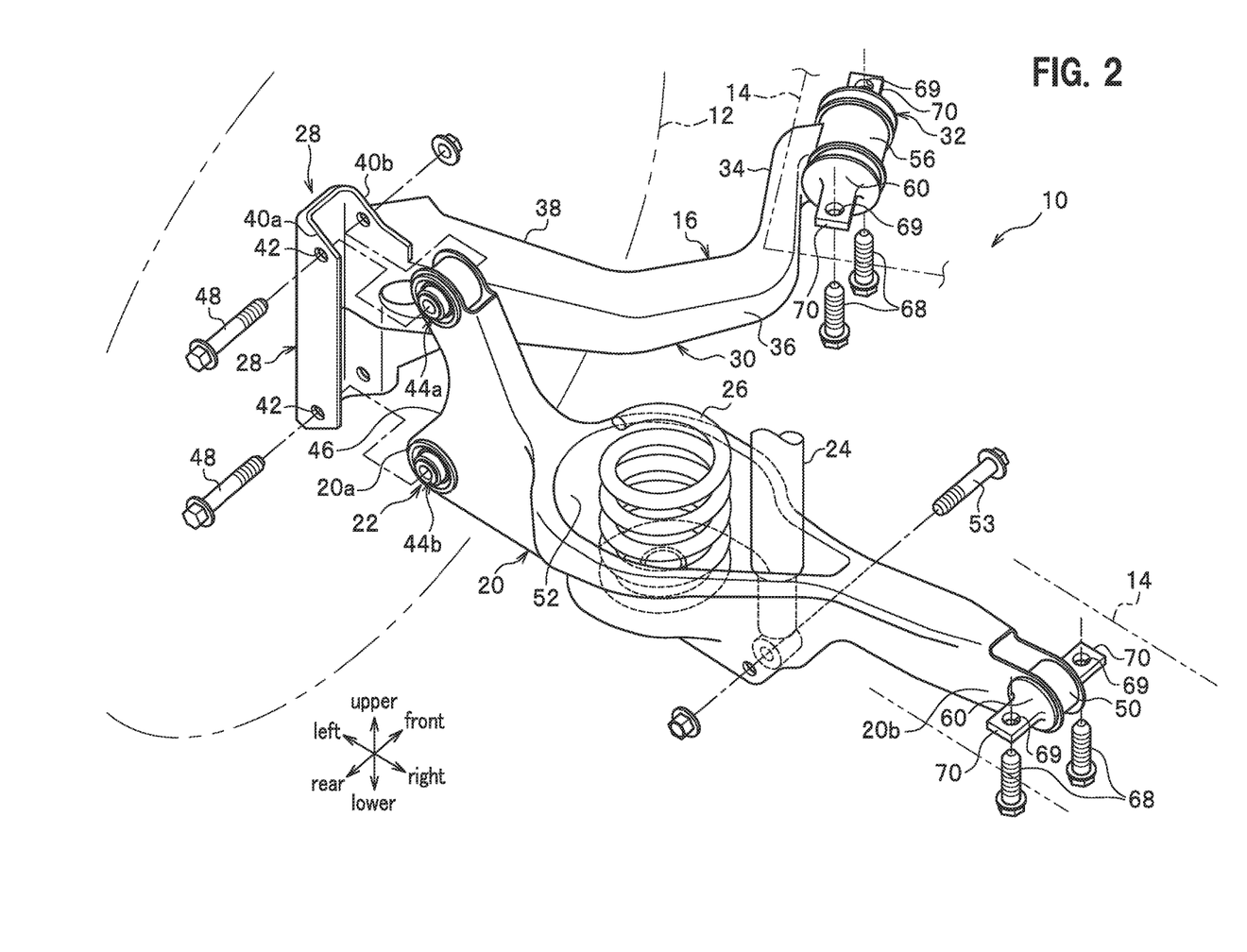
FIG. 2 is an exploded perspective view of the suspension device shown in FIG. 1.
Figure 3:
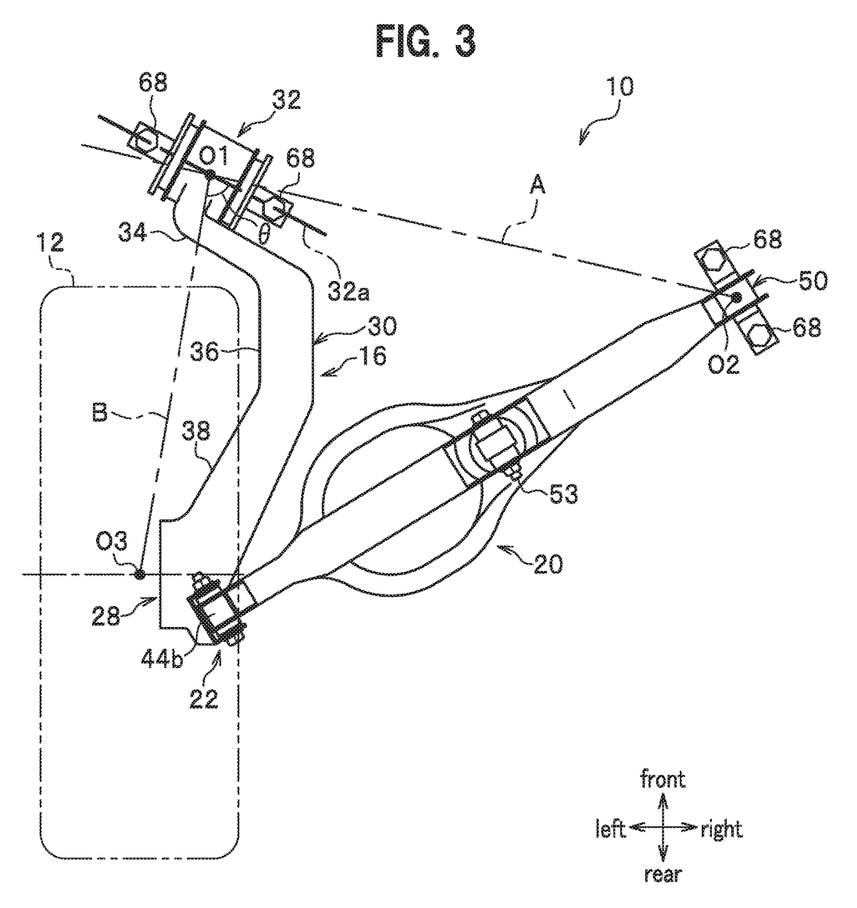
FIG. 3 is a bottom view of the suspension device shown in FIG. 1 as viewed from right below.
Figure 4:
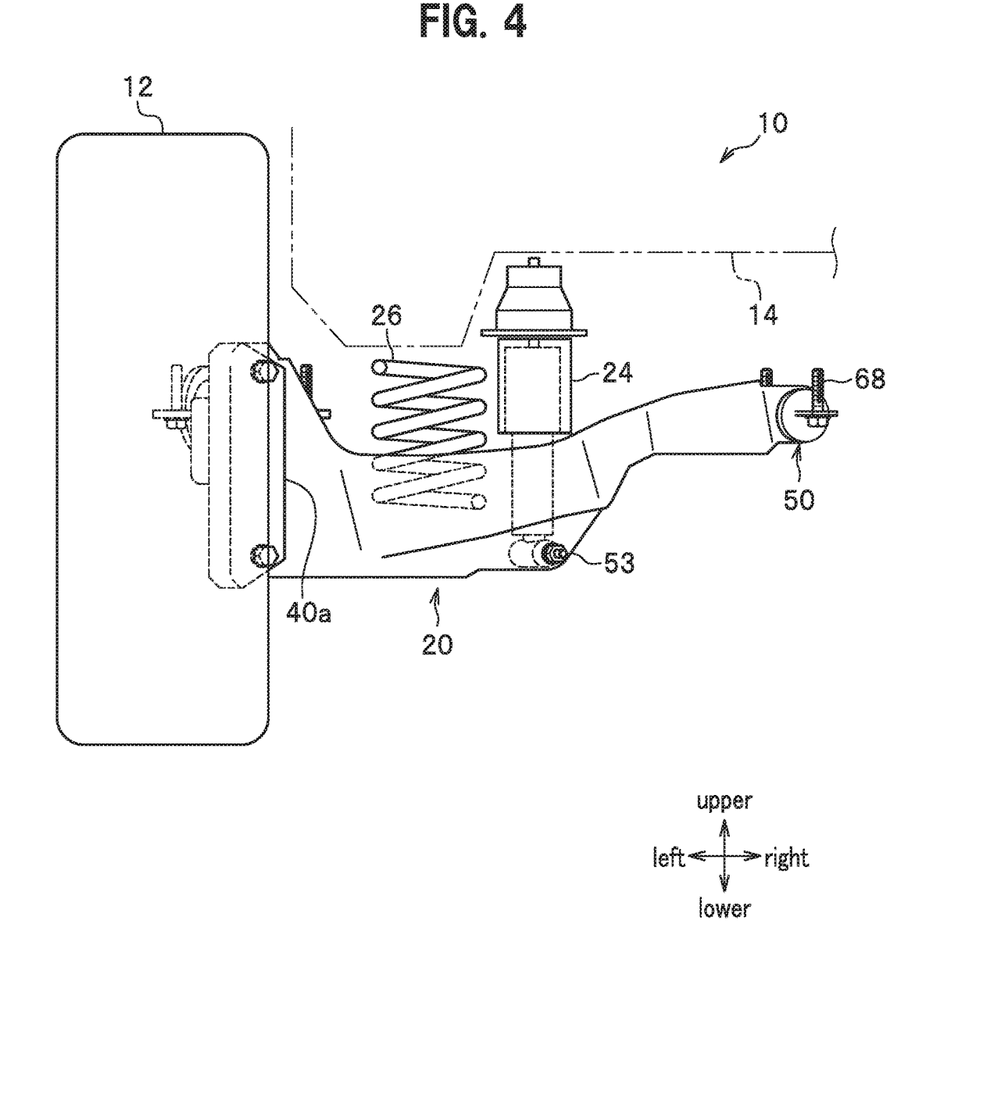
FIG. 4 is a side view of the suspension device shown in FIG. 1 as viewed in a diagonal direction from the vehicle rear side.

Hereinafter, embodiments of the present invention are described in detail with reference to the accompanying drawings as appropriate. FIG. 1 is a bottom plan view of a state where a suspension device according to an embodiment of the present invention is applied respectively to a left rear wheel and a right rear wheel, as viewed from right below a vehicle. FIG. 2 is an exploded perspective view of the suspension device shown in FIG. 1. FIG. 3 is a bottom plan view of the suspension device shown in FIG. 1 as viewed from right below thereof. FIG. 4 is a side view of the suspension device shown in FIG. 1 as viewed in a diagonal direction from the vehicle rear side. In the figures, "front and rear" indicates the vehicle front-rear direction, "left and right" indicates the vehicle width direction (left-right direction), and "upper and lower" indicates the vehicle upper-lower direction (vertical direction) respectively.

As shown in FIG. 1, a suspension device 10 is disposed independently to a left rear wheel 12 and a right rear wheel 12 (hereinafter also referred to as a wheel 12), and is configured as an independent suspension type rear suspension that supports left and right rear wheels 12, 12 in a rotatable manner. The right rear wheel 12 and left rear wheel 12 are disposed such that rear suspensions 10, 10 of the same configuration are located symmetrically with each other.

As shown in FIG. 2, the suspension device 10 includes a semi-trailing suspension including: a trailing arm 16 that pivotally supports the wheel (left rear wheel) 12 via an axle (not shown) in a rotatable manner and is coupled to a vehicle body 14 in a turnable manner; a lower arm 20 that supports a vehicle rear side of the trailing arm 16; and a hinge mechanism 22 that couples the trailing arm 16 and lower arm 20 to each other in a relatively displaceable manner. Further, the suspension device 10 includes a damper 24 and a spring 26, which are disposed on the lower arm 20 separately.

The trailing arm 16 is located at a rear end in the vehicle front-rear direction and includes an arm body section 28 provided with the hinge mechanism 22, and an arm section 30 extending from the arm body section 28 in the vehicle front-rear direction. A trailing bush 32 that pivotally supports the trailing arm 16 in a turnable manner is mounted at the vehicle front side end of the arm section 30.

As shown in FIGS. 2 and 3, the arm section 30 includes: an L-shaped bent section 34 that is mounted on the trailing bush 32 and bends substantially in a L-shape in the bottom view; a linear section 36 that is continuous to the L-shaped bent section 34 and extends substantially linearly along the vehicle front-rear direction; and an intersection section 38 that extends from the linear section 36 to the arm body section 28, and extends from the vehicle width direction inner side toward the vehicle width direction outer side and intersects with the vehicle front-rear direction in the bottom view.

As shown in FIG. 2, the arm body section 28 includes a pair of opposite pieces 40a, 40b that extend in the vehicle body vertical direction and face substantially in parallel with each other. The pair of opposite pieces 40a, 40b protrude substantially inward in the vehicle width direction respectively, and a bolt insertion hole 42 is formed at the top and bottom thereof.

The lower arm 20 includes a vehicle width outer end 20a and a vehicle width inner end 20b. The vehicle width outer end 20a is provided with a pair of rubber bushes 44a, 44b separated by a predetermined distance in the vertical direction from each other. A recess section 46 recessed substantially in a V-shape as viewed from the vehicle rear side is formed between the pair of rubber bushes 44a, 44b. The trailing arm 16 and the lower arm 20 are coupled to each other in a manner allowing a relative displacement via a pair of bolts 48, 48 inserted respectively into the bolt insertion holes 42 corresponding to the pair of rubber bushes 44a, 44b and the pair of opposite pieces 40a, 40b.

The hinge mechanism 22 includes the pair of opposite pieces 40a, 40b provided on the arm body section 28 of the trailing arm 16, the vehicle width outer end 20a of the lower arm 20, the pair of rubber bushes 44a, 44b mounted on the vehicle width outer ends 20a, 20a of the lower arm 20, and the pair of bolts 48, 48 that couple the vehicle rear end of the trailing arm 16 and the vehicle width outer end 20a of the lower arm 20 to each other via the pair of rubber bushes 44a, 44b.

The vehicle width inner end 20b of the lower arm 20 is provided with a lower arm bush 50 that supports the lower arm 20 with respect to the vehicle body 14 (for example, a cross member, see FIG. 1) in a turnable manner.

A recess 52 of a composite shape formed by combination of a substantially circular shape and a triangular shape as viewed from top is disposed between the vehicle width outer end 20a and the vehicle width inner end 20b of the lower arm 20 (see FIG. 2). The recess 52 is provided with the damper 24 that attenuates vibration transmitted from the wheel 12, and a spring (coil spring) that exhibits a spring force, separately from each other. The damper 24 is attached to the lower arm 20 in a turnable manner with a rod 53 coupled to the lower arm 20 as the turning center.

As shown in FIG. 4, in the recess 52 (see FIG. 2), the spring 26 is disposed on the vehicle width outer side, and the damper 24 is disposed on the vehicle width inner side. In other words, the damper 24 is disposed deeper into inner side of the vehicle width direction of the lower arm 20 than the spring 26. Effects of such arrangements are described later in detail (see FIG. 8B).

Thus, the trailing arm 16 and the lower arm 20 are mounted on the vehicle body 14 respectively via the trailing bush 32 and the lower arm bush 50 in a turnable manner. A suspension movable axis A is formed by connecting a turning center point O1 of the trailing arm 16 to a turning center point O2 of the lower arm bush 50 with each other by an imaginary line. The suspension movable axis A is a turning axis of the suspension device 10 with respect to the vehicle body 14.

Figure 5A:
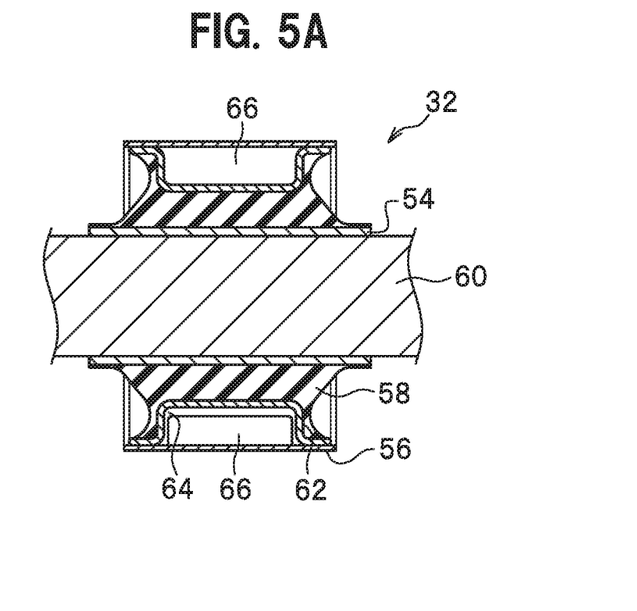
FIG. 5A is a cross section in the axial direction of the trailing bush shown in FIG. 2.
Figure 5B:
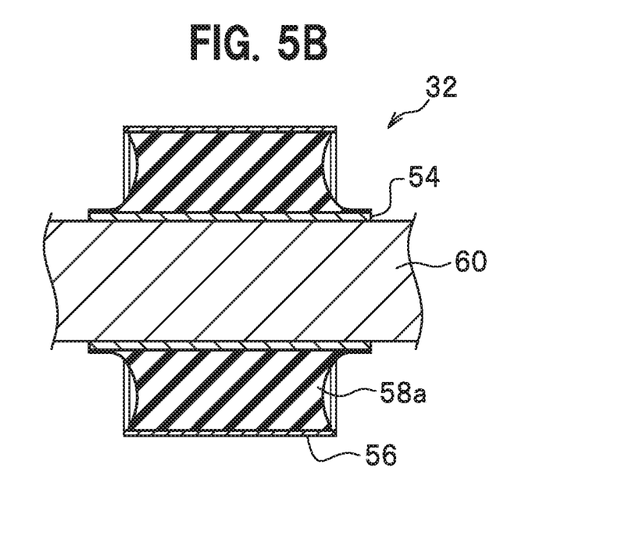
FIG. 5B is a cross section in the axial direction of a trailing bush according to another modified example.

FIG. 5A is a cross section in the axial direction of the trailing bush shown in FIG. 2, and FIG. 5B is a cross section in the axial direction of a trailing bush according to another modified example. Since the trailing bush 32 and the lower arm bush 50 has the same configuration, the trailing bush 32 is described in detail, and description of the lower arm bush 50 is omitted.

As shown in FIG. 5A, the trailing bush 32 includes an inner cylindrical member 54, an outer cylindrical member 56 that is disposed on the outer diameter side of the inner cylindrical member 54 and coupled to the trailing arm 16, a rubber elastic body 58 provided between the inner cylindrical member 54 and the outer cylindrical member 56, and a shaft member 60 that passes through the inner cylindrical member 54.

An intermediate sleeve 62 is provided between the inner cylindrical member 54 and the outer cylindrical member 56. The intermediate sleeve 62 includes an arc-shaped recess 64 extending in the circumferential direction. A sealed space section 66 is disposed between the arc-shaped recess 64 and an inner wall of the outer cylindrical member 56. The space section 66 functions as a liquid sealing compliance bush when a liquid (not shown) is sealed.

As indicated by a trailing bush 32 according to a modified example of FIG. 5B, the bush is not limited to the liquid sealing type bush. For example, a bush formed only by a rubber elastic body 58a adhered by vulcanization adhesion between the inner cylindrical member 54 and the outer cylindrical member 56 may be used without provision of the intermediate sleeve 62 and the space section 66.

As shown in FIG. 2, flat-plate-shape plate pieces 70, 70 having a pair of mounting holes 69, 69 into which bolts 68, 68 may be inserted are provided on both sides of the shaft member 60 in the axial direction. The trailing bush 32 is attached to the vehicle body 14 by inserting mounting holes 69, 69 into bolts 68, 68. Also, the trailing bush 32 may be attached to a bracket (not shown) provided on the vehicle body 14 in a turnable manner by inserting bolts 68, 68 directly into the inside of the inner cylindrical member 54, without using the flat-plate-shape plate pieces 70, 70.

An axis of the shaft member 60 is aligned with the turning axis 32a of the trailing bush 32. As shown in FIG. 3, the turning axis 32a of the trailing bush 32 is disposed to be inclined toward the vehicle body inner rear side as viewed from bottom, with respect to the suspension movable axis (imaginary line) A that connects the turning center point O1 of the trailing arm 16 relative to the vehicle body 14 to the turning center point O2 of the lower arm 20 with each other.

In this embodiment, the suspension device 10 is shown as viewed from right bottom of the vehicle body 14. However, when the vehicle body 14 is viewed from top, the suspension device 10 is depicted in a position symmetrical to the position of FIG. 3. Therefore, a point where the turning axis 32a of the trailing bush 32 is disposed to be inclined toward the vehicle body inner rear side as viewed from top, with respect to the suspension movable axis (imaginary line) A is the same as the case where the vehicle body 14 is viewed from right bottom.

In other words, the turning axis 32a of the trailing bush 32 is on an axis different from the suspension movable axis A as viewed from bottom, and is set to a location turned by a predetermined angle in the clockwise direction with the turning center point O1 of the trailing bush 32 as a base point.

An intersection angle θ between an imaginary line B that connects the axle center point O3 of the wheel 12 to the turning center point O1 of the trailing arm 16 with each other and the turning axis 32a of the trailing bush 32 is set to be smaller than or equal to 90 degrees (θ≤90 degrees).

The suspension device 10 according to this embodiment is basically configured as above. Next, advantageous effects thereof are described.

Figure 6A:
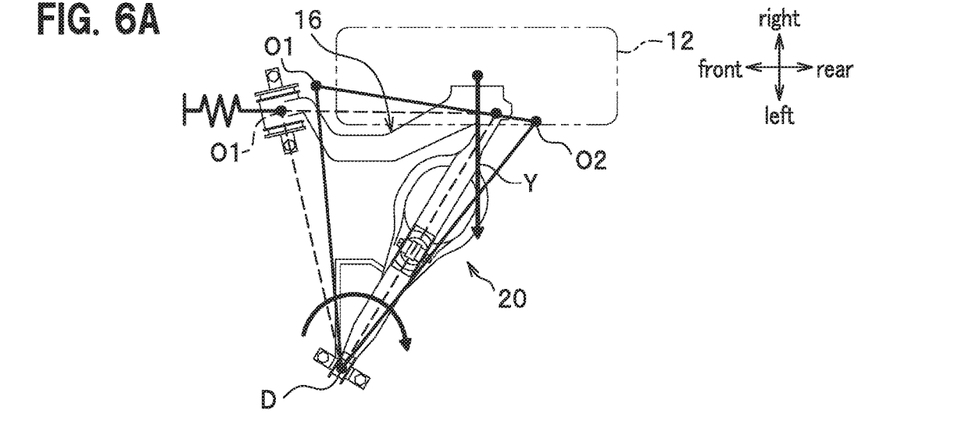
FIG. 6A is a schematic bottom plan view of a suspension device according to a comparative example 1, the suspension device being a general semi-trailing suspension device.
Figure 6B:
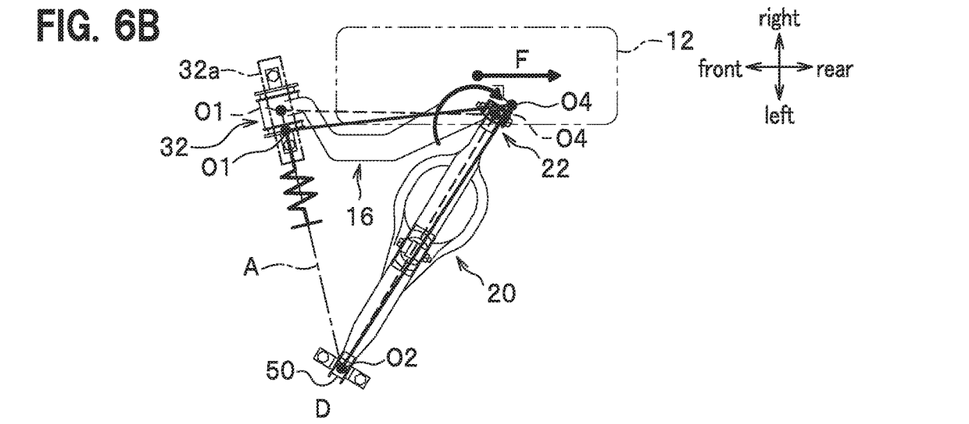
FIG. 6B is a schematic bottom plan view of a suspension device according to a comparative example 2, the suspension device being a conventional semi-trailing suspension device in which a trailing arm and lower arm are hinge-coupled to each other.
Figure 6C:
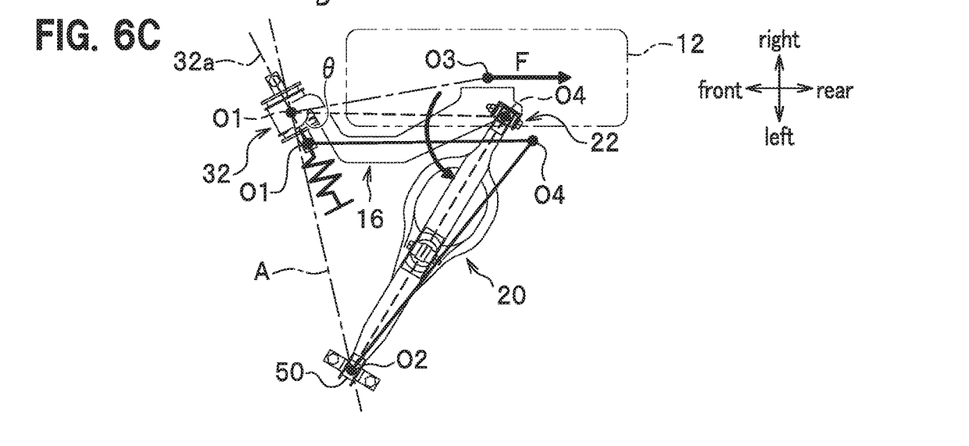
FIG. 6C is a schematic bottom plan view of a semi-trailing suspension device according to the present embodiment.

FIG. 6A is a schematic bottom plan view of a suspension device according to a comparative example 1, the suspension device being a general semi-trailing suspension device; FIG. 6B is a schematic bottom plan view of a suspension device according to a comparative example 2, the suspension device being a conventional semi-trailing suspension device in which a trailing arm and lower arm is hinge-coupled to each other; and FIG. 6C is a schematic bottom plan view of a semi-trailing suspension device according to the this embodiment.

As shown in FIG. 6A, the suspension device according to the comparative example 1 is a semi-trailing suspension device not provided with the hinge mechanism 22, wherein the trailing arm 16 and the lower arm 20 are integrated with each other. In the comparative example 1, for example, when a lateral force Y is applied to the wheel 12, the lateral force Y is transmitted to a coupling point D between the vehicle body and lower arm 20. Thus, in the comparative example 1, the coupling point D is subjected to a load in the clockwise direction (see arc-shaped arrow), and thereby a defect that direction of the wheel 12 turns to the toe-out direction is caused.

As shown in FIG. 6B, in the comparative example 2, the trailing arm 16 and the lower arm 20, which are configured separately, are coupled by the hinge mechanism 22 to each other, and the turning axis 32a of the trailing bush 32 and the suspension movable axis A are configured so as to be aligned with each other. In the comparative example 2, the hinge mechanism 22 is added to the general semi-trailing suspension device shown in the comparative example 1. Thus, in the comparative example 2, when a lateral force Y is applied to the wheel 12, a force in the counterclockwise direction (not shown) relative to the wheel 12 acts with the hinge mechanism 22 as a turning center and causes the wheel 12 to face in the toe-in direction.

However, in the comparative example 2, as shown in FIG. 6B, when a braking force F is inputted, the turning center point O1 of the trailing arm 16 displaces along the suspension movable axis A and causes a force in the clockwise direction (see arc-shaped arrow) acting on the wheel 12. Thus, in the comparative example 2, when the braking force F is applied to the wheel 12, a defect that the wheel 12 faces in the toe-out direction is caused.

As shown in FIG. 6C, in this embodiment, the turning axis 32a of the trailing bush 32 is disposed to be inclined toward the vehicle body inner rear side by a predetermined angle on an axis different from the suspension movable axis A. Thereby, when the braking force F is applied to the wheel 12, a force (tensile force) drawing the turning center point O1 of the trailing arm 16 toward the vehicle body inner rear side acts. In this embodiment, a force drawing the turning center point O1 of the trailing arm 16 toward the vehicle body inner rear side is generated, and thereby direction of the wheel 12 is turned to the toe-in direction. In this embodiment, when the lateral force Y is applied to the wheel 12, direction of the wheel 12 is turned to the toe-in direction as in the comparative example 2.

Figure 7A:
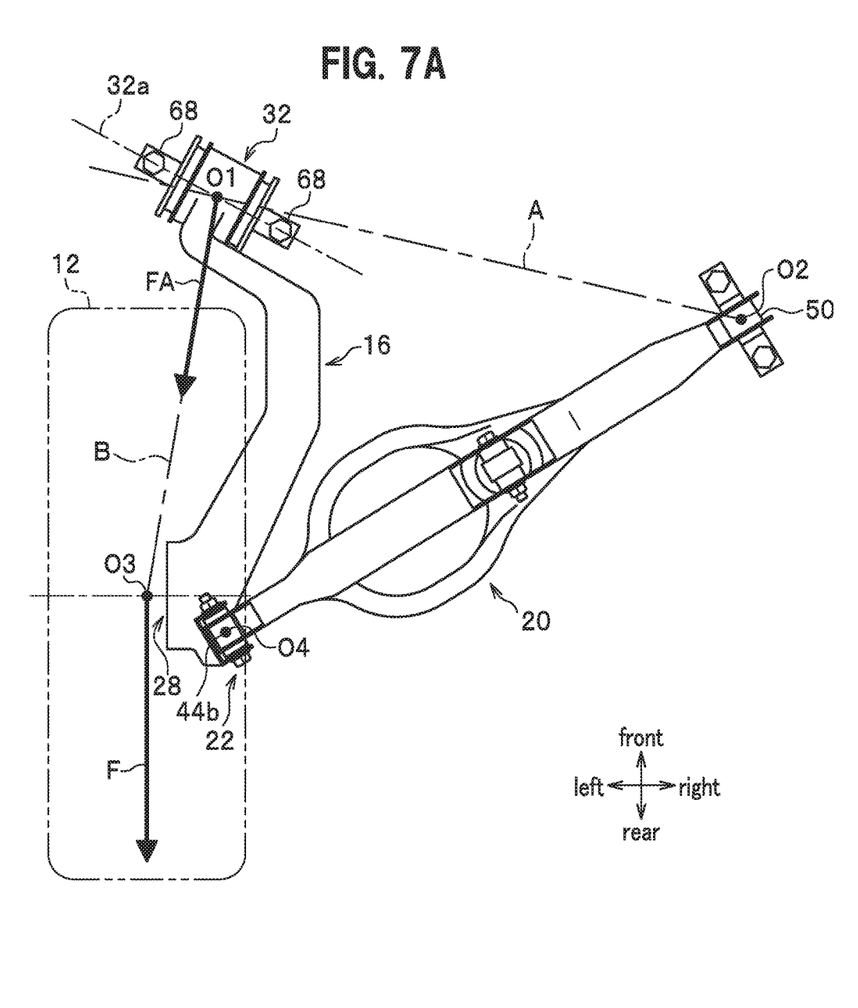
FIGS. 7A and 7B illustrate actions of the suspension device according to the present embodiment.
Figure 7B:
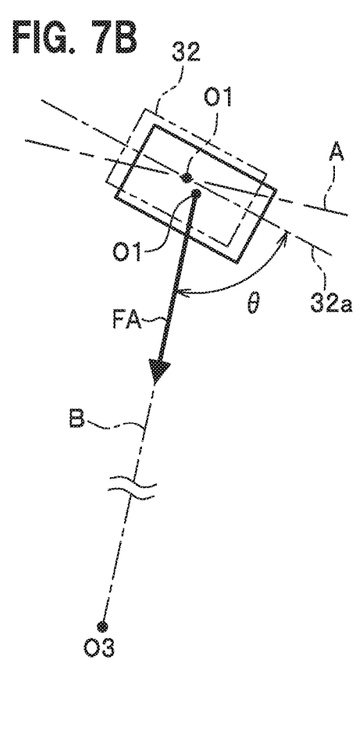
Figure 8A:
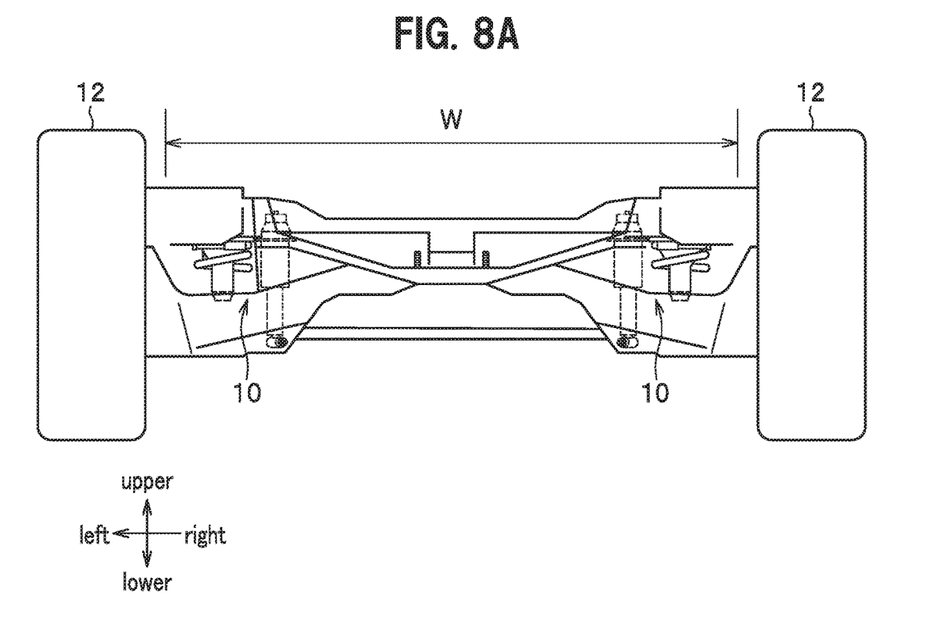
FIG. 8A shows advantageous effects of the suspension device according to the present embodiment.
Figure 8B:
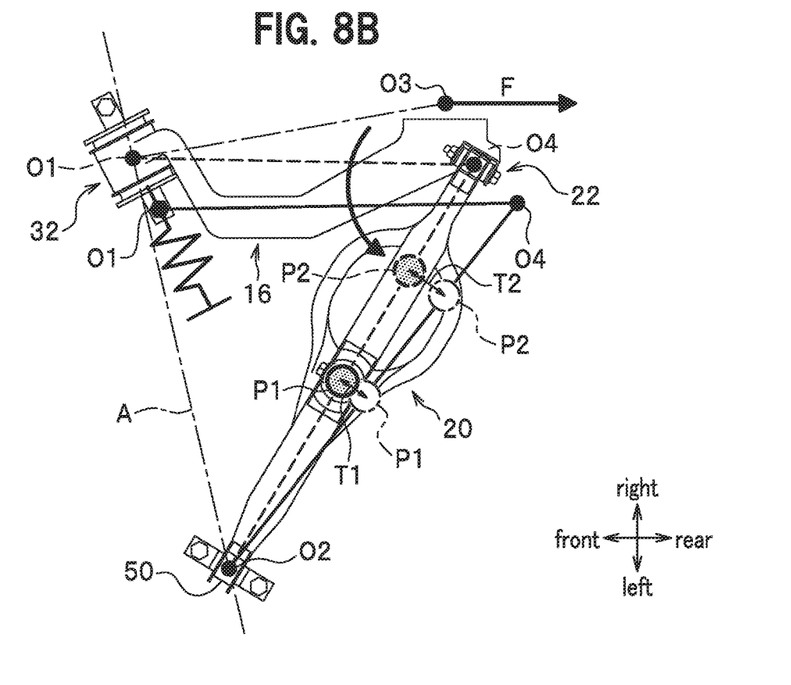
FIG. 8B is a schematic diagram indicating the movement of the damper support point.

Actions of this embodiment are described in more detail. FIGS. 7A and 7B illustrate actions of the suspension device according to this embodiment, FIG. 8A shows effects of the suspension device according to this embodiment, and FIG. 8B is a schematic diagram indicating the movement of the damper support point.

The trailing bush 32 of the cylindrical shape is generally set such that rigidity becomes smaller in the axial direction of the shaft member 60 and becomes larger in the direction vertical to the axis of the shaft member 60. As shown in FIG. 7A, when the braking force F is applied to the wheel 12, a bush input load FA being a component force is generated in the trailing bush 32 in a direction connecting the axle center point O3 to the turning center point O1 of the trailing arm 16 with each other.

In this embodiment, the turning axis 32a of the trailing bush 32 is disposed to be inclined toward the vehicle body inner rear side by a predetermined angle on an axis different from the suspension movable axis A, and an intersection angle θ between the turning axis 32a of the trailing bush 32 and the imaginary line B is set to be smaller than or equal to 90 degrees. Thereby, the turning center point O1 of the trailing arm 16 moves by being drawn toward the vehicle body inner rear side by the bush input load FA (tensile force FA) (see FIG. 7B). As a result, direction of the wheel 12 turns to the toe-in direction. In FIG. 7B, the trailing bush 32 is schematically indicated by a rectangular box, a state thereof before the bush input load FA is applied is indicated by a double dashed and dashed line, and a state thereof after the bush input load FA is applied is indicated by a solid line.

In other words, in this embodiment, a turning axis 32a of the trailing bush 32 is disposed to be inclined toward the inner rear side of the vehicle body in the bottom view with respect to the suspension movable axis A that connects the turning center point O1 of the trailing arm 16 to the turning center point O2 of the lower arm 20 with each other, and thereby, when the braking force F is applied to the wheel 12, a load in the clockwise direction (see arc-shaped arrow in FIG. 6C) is applied to a point O4 coupling the trailing arm 16 and the lower arm 20 to each other. Thus, in this embodiment, the turning center point O1 of the trailing arm 16 is displaced into the vehicle width direction inner side, and direction of the wheel 12 turns to the toe-in direction. Consequently, in this embodiment, vehicle stability (or direction stability of vehicle) is ensured even when the braking force F is applied to the wheel 12.

In this embodiment, the intersection angle θ between the turning axis 32a of the trailing bush 32 and the imaginary line B that connects the axle center point O3 of the wheel 12 to the turning center point O1 of the trailing arm 16 with each other is preferably set to be smaller than or equal to 90 degrees (θ≤90 degrees) to generate a load in the clockwise direction (see arc-shaped arrow of FIG. 6C) at the point O4 (see FIG. 6C) that couples the trailing arm 16 and the lower arm 20 to each other.

In FIG. 8B, P1 represents a damper support point in this embodiment, P2 represents a damper support point in a conventional technique, T1 represents a movement of the damper support point in this embodiment, and T2 represents a movement of the damper support point in the conventional technique. In the conventional technique, the damper 24 is disposed deeper into vehicle width direction outer side of the lower arm 20 than the spring 26. Thus, according to the conventional technique, for example, when the braking force F is inputted and thereby the trailing arm 16 and the lower arm 20 are displaced, the movement T2 of the damper support point P2 becomes larger. Meanwhile, in this embodiment, the damper 24 is disposed closer to the inner side of the vehicle width direction of the lower arm 20 than the spring 26. Thus, for example, when the braking force F or the lateral force Y is inputted, the movement T1 of the damper support point P1 caused by displacement of the trailing arm 16 and the lower arm 20 may be suppressed to the minimum (T1≤T2). Thus, according to one aspect of the present invention, ride comfort is enhanced. In other words, in this embodiment, since the vertical input load to the damper 24 is equalized, the damper 24 operates smoothly and thereby improves the ride comfort. Also, in this embodiment, space in the vehicle width direction of the vehicle body 14 may be increased (see FIG. 4). Thus, compared with the conventional technique, width dimension W of a trunk lid shown in FIG. 8A may be increased.

Further, in this embodiment, the trailing arm 16 has a simple configuration including the arm body section 28, L-shaped bent section 34, linear section 36, and intersection section 38. This allows a longer distance between the turning center point O1 of the trailing arm 16 and the turning center point O2 of the lower arm 20 as compared with the conventional technique. Thus, in this embodiment, rigidity to the lateral force Y may be enhanced, and toe variation due to lack of the rigidity may be suppressed.

Further, in this embodiment, since the distance from the arm body section 28 to the turning center point O1 of the trailing arm 16 may be set longer, the intersection angle θ between the imaginary line B that connects the axle center point O3 of the wheel 12 to the turning center point O1 of the trailing arm 16 with each other and the turning axis 32a of the trailing bush 32 may be reduced as compared with the conventional technique shown in FIGS. 9A and 9B. Consequently, in this embodiment, the prying angle of the trailing bush 32 in the suspension stroke may be suppressed, and durability of the trailing bush 32 may be further enhanced.

REFERENCE SIGN LIST 10 rear suspension
12 wheel
14 vehicle body
16 trailing arm
20 lower arm
22 hinge mechanism
24 damper
26 spring
28 body section
30 arm section
32 trailing bush
32a L-shaped bent section
34 L-shaped bent section
36 linear section
38 intersection section
50 lower arm bush
A suspension movable axis
B imaginary line
O1 turning center point of trailing arm
O2 turning center point of the lower arm
O3 axle center point
θ intersection angle

The invention claimed is:

1. A semi-trailing suspension device comprising:
a trailing arm that is coupled to a vehicle body in a turnable manner;
a trailing bush that is provided between the vehicle body and the trailing arm and which pivotally supports the trailing arm in a turnable manner;
a lower arm that is coupled to the vehicle body in a turnable manner;
a lower arm bush that is provided between the vehicle body and the lower arm and which pivotally supports the lower arm in a turnable manner;
a hinge mechanism that couples the trailing arm and the lower arm to each other in a relatively displaceable manner,
a damper that attenuates vibration transmitted from a wheel; and
a spring,
wherein a turning axis of the trailing bush is disposed to be inclined toward a vehicle body inner rear side as viewed from top, with respect to a suspension movable axis that connects a turning center point of the trailing arm with respect to the vehicle body to a turning center point of the lower arm, and
wherein the damper and the spring are disposed separately from each other on the lower arm, and the damper is disposed closer to a vehicle width direction inner side of the lower arm than the spring.

2. The semi-trailing suspension device according to claim 1, wherein
the trailing arm includes:
an arm body section that is located at a rear end in a vehicle front-rear direction and provided with the hinge mechanism;
an L-shaped bent section that is mounted on the trailing bush and is bent in a substantially L-shape in the top view;
a linear section that is continuous to the L-shaped bent section and extends substantially linearly along the vehicle front-rear direction; and
an intersection section that extends from the linear section to the arm body section, and extends from a vehicle width direction inner side toward a vehicle width direction outer side and intersects with the vehicle front-rear direction in the top view.

* * * * *